Figure 2:
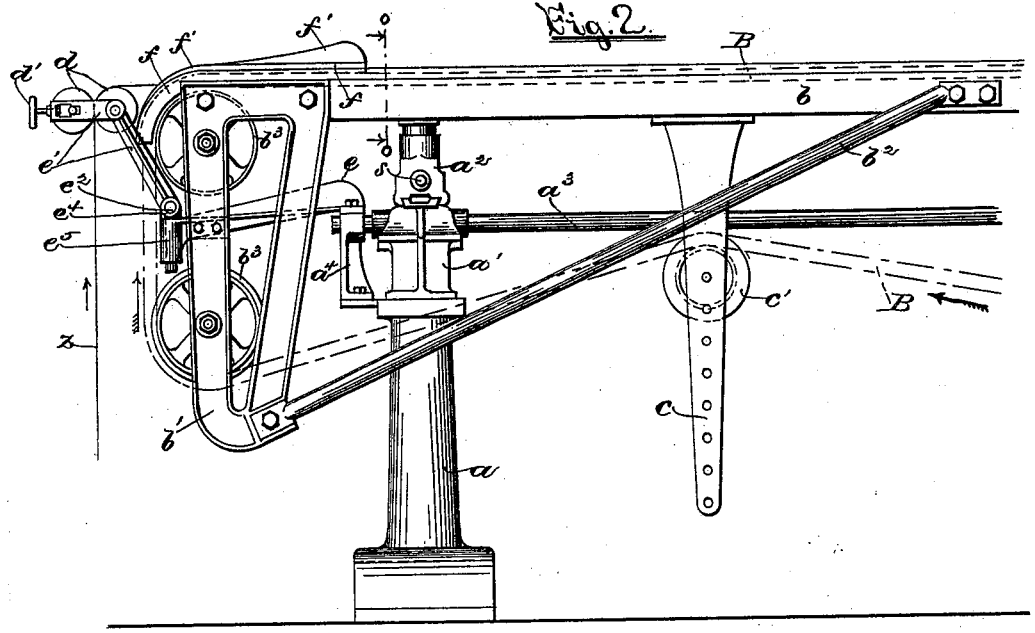

(No Model.)  5 Sheets—Sheet 1.
A. W. C. ARNOLD.
CLOTH TENTERING MACHINE AND CHAIN THEREFOR.
No. 568,508.  Patented Sept. 29, 1896.
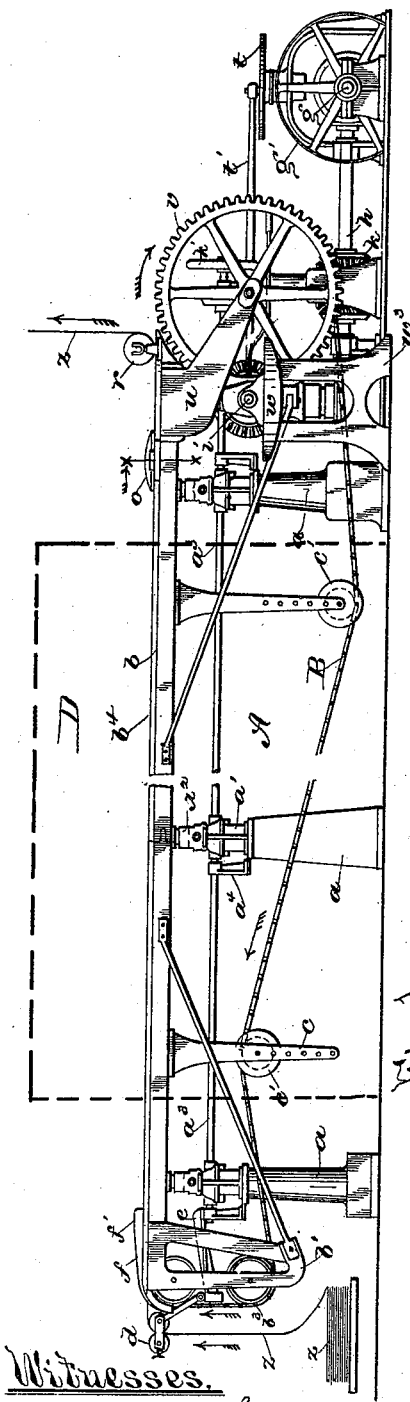
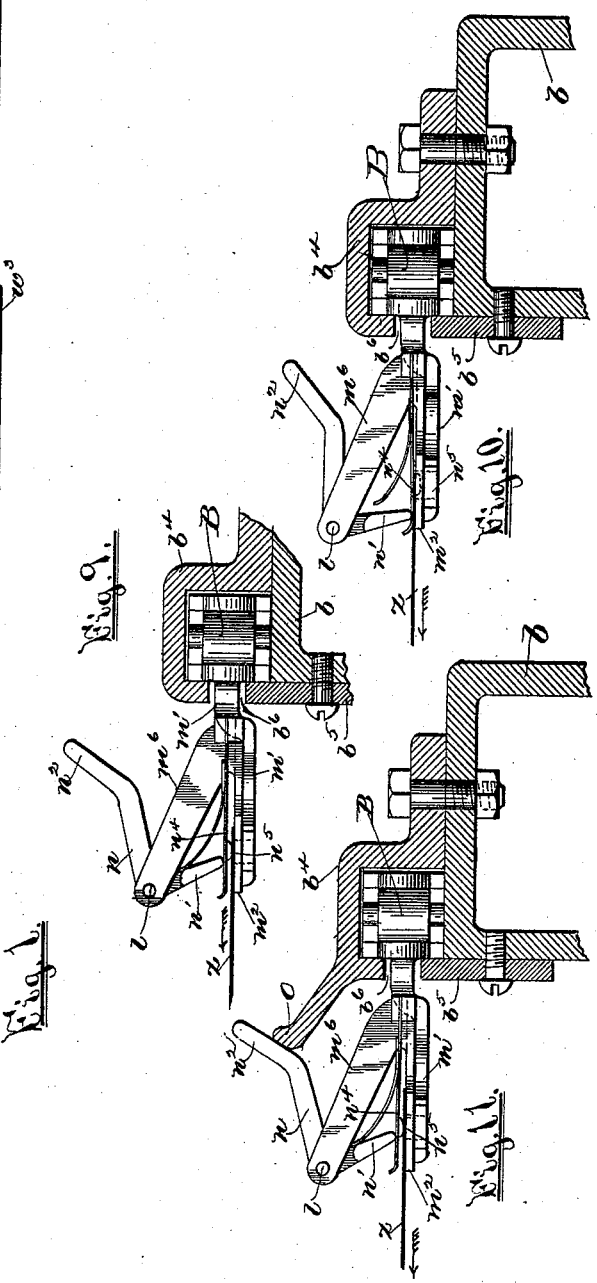
Witnesses.
Willard A. Smith
Remington Sherman
Inventor.
Amos W. C. Arnold.
by Geo. H. Remington & Co.
Attorneys.

(No Model.) 5 Sheets—Sheet 2.
A. W. C. ARNOLD.
CLOTH TENTERING MACHINE AND CHAIN THEREFOR.
No. 568,508. Patented Sept. 29, 1896.

Witnesses
Willard A. Smith
Remington Sherman

Inventor
Amos W. C. Arnold
by Geo. H. Remington & Co.
Attorneys (No Model.) 5 Sheets—Sheet 3.
A. W. C. ARNOLD.
CLOTH TENTERING MACHINE AND CHAIN THEREFOR.
No. 568,508. Patented Sept. 29, 1896.
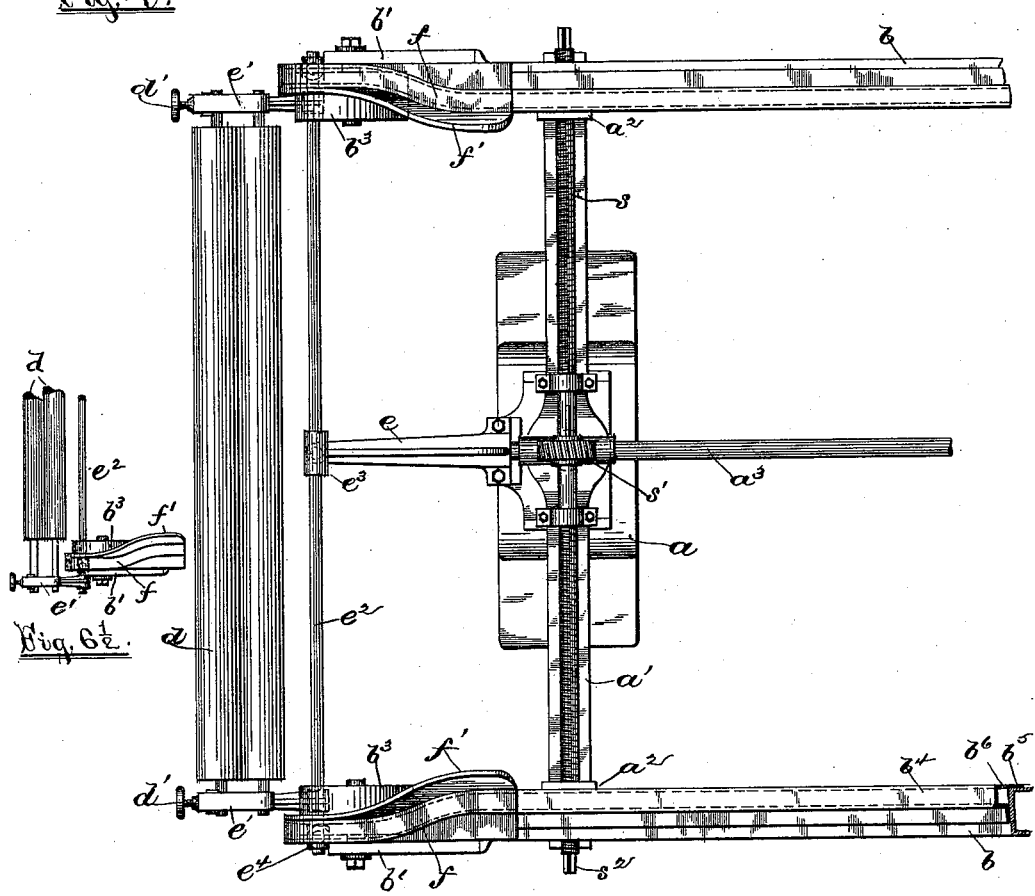
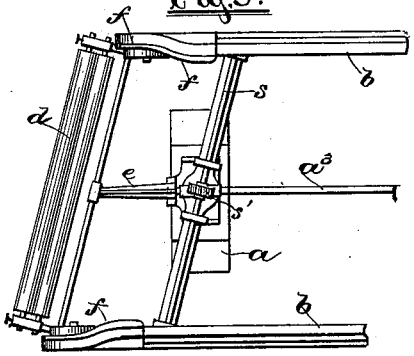
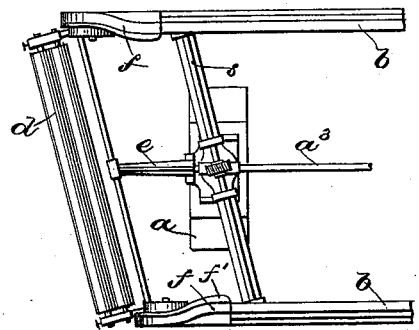
Witnesses.
Willard A. Smith.
Remington Sherman
Inventor.
Amos W. C. Arnold
by Geo. H. Remington & Co.
Attorneys.

(No Model.) 5 Sheets—Sheet 4.
A. W. C. ARNOLD.
CLOTH TENTERING MACHINE AND CHAIN THEREFOR.
No. 568,508. Patented Sept. 29, 1896.
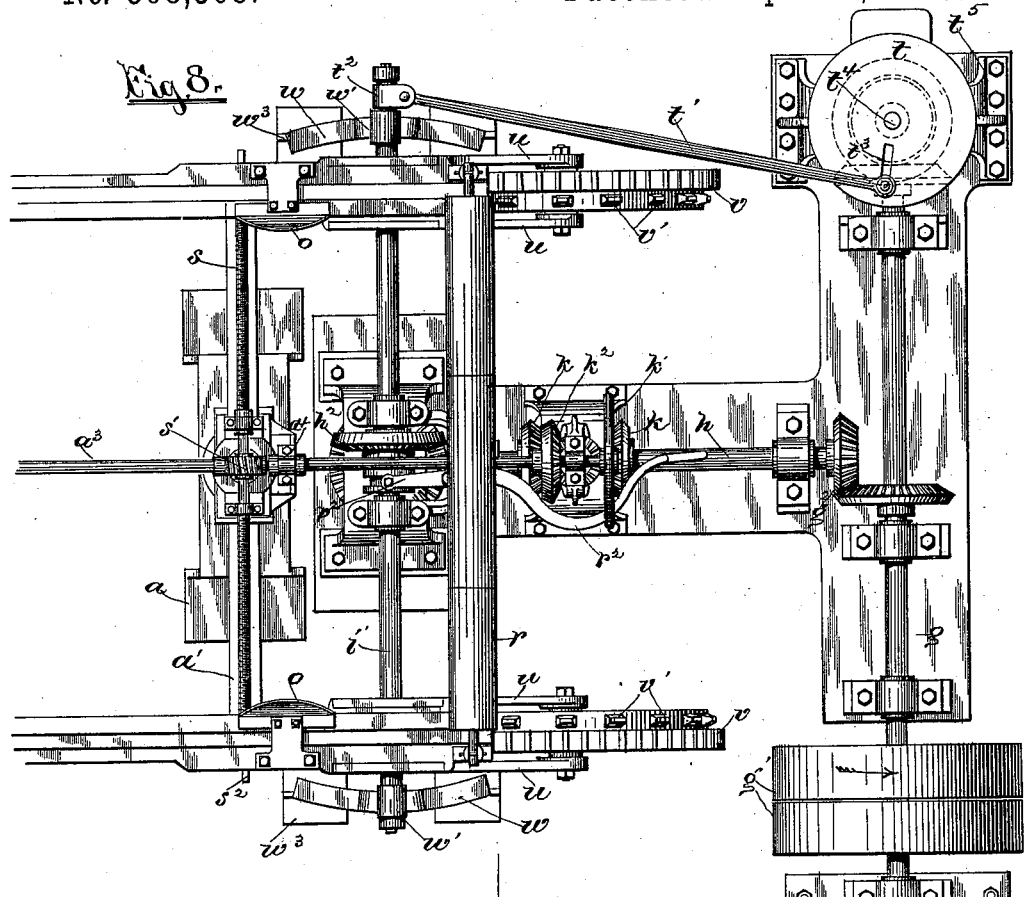
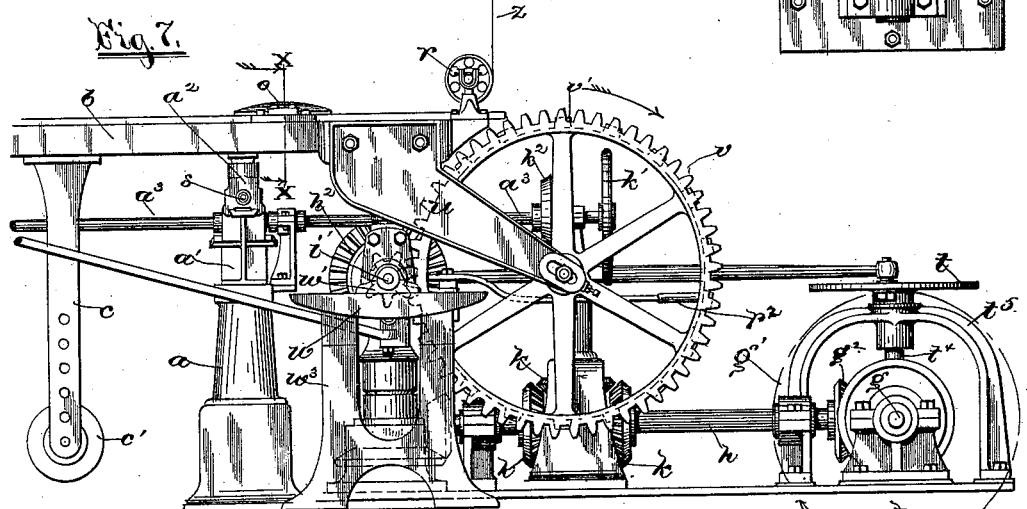
Witnesses.
Willard A. Smith.
Remington Sherman.
Inventor.
Amos W. C. Arnold.
by Geo. H. Remington & Co.
Attorneys.

(No Model.) 5 Sheets—Sheet 5.

A. W. C. ARNOLD.
CLOTH TENTERING MACHINE AND CHAIN THEREFOR.

No. 568,508. Patented Sept. 29, 1896.

Witnesses.
Willard A. Smith.
Remington Sherman.

Inventor,
Amos W. C. Arnold
by Geo. H. Remington & Co.
Attorneys.

United States Patent Office.

AMOS W. C. ARNOLD, OF PROVIDENCE, RHODE ISLAND.

CLOTH-TENTERING MACHINE AND CHAIN THEREFOR.

SPECIFICATION forming part of Letters Patent No. 568,508, dated September 29, 1896.

Application filed January 20, 1896. Serial No. 576,110. (No model.)

*To all whom it may concern:*

Be it known that I, AMOS W. C. ARNOLD, a citizen of the United States, residing at Providence, in the county of Providence and State of Rhode Island, have invented certain new and useful Improvements in Cloth-Tentering Machines and Chains Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in "tentering-machines," so called, and carrier-chains therefor; and it consists in the novel construction and arrangement of parts, all as hereinafter fully described and claimed.

In machines of the class above referred to it has hitherto been usual to provide attendants (one on each side of the machine) at the head or entering end of the machine to properly feed and guide the cloth or fabric into the self-closing jaws of the continuously-traveling carrier or side chains. In some cases the frames or rails of such machines are normally stationary, the chains being mounted to travel in horizontal planes. In such event it is usual to give a zigzag movement to the traveling chains alternately, thereby imparting to the goods or fabric a peculiar and desirable finish, termed an "elastic" or "soft" finish. Tenter-machines have, however, been constructed having the two side rails thereof adapted to reciprocate to and fro alternately, the carrier-chains at the same time traveling therein at a substantially uniform rate of speed and in vertical planes, the machine being also adapted to give to the goods the peculiar finish just referred to. In all such former devices or mechanisms the fabric under treatment is, as before stated, always fed into the machines by attendants. These persons must be skilled operatives in order to properly present the cloth to the chain while the latter is being reciprocated back and forth.

The object I have in view is to produce a tenter-machine capable of imparting to the goods the elastic finish referred to and at the same time having the goods fed to the machine mechanically, thereby dispensing with the said two or more attendants hitherto employed in machines of this class. Moreover, by means of my improvements the rate of speed may be materially increased, thereby effecting a corresponding increase in the product or quantity of goods passing through the machine in a given time. Another advantage resulting from the use of my invention is that the goods are stretched in a more uniform manner than formerly, while at the same time the texture or arrangement of the threads of the web are substantially true and regular and not distorted, the latter result being a defect produced by tenter-machines unprovided with my improvements.

Figure 3:
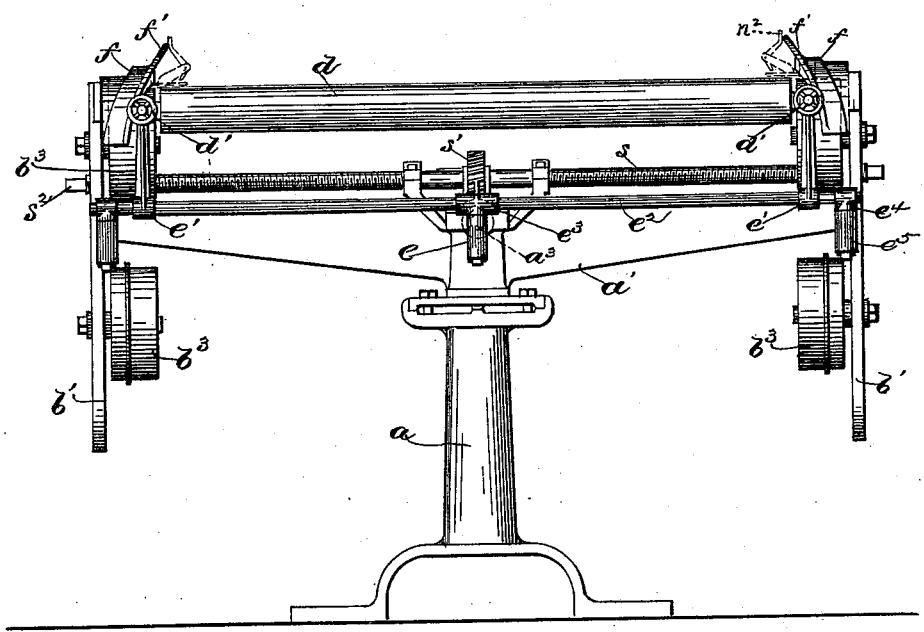
Figure 13:
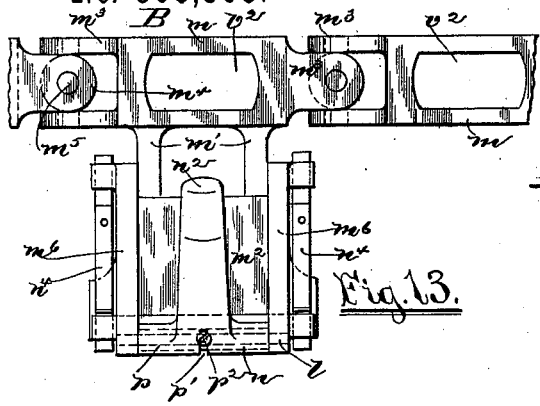
Figure 14:
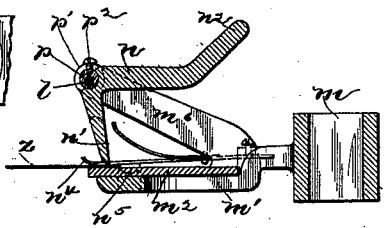
Figure 12:
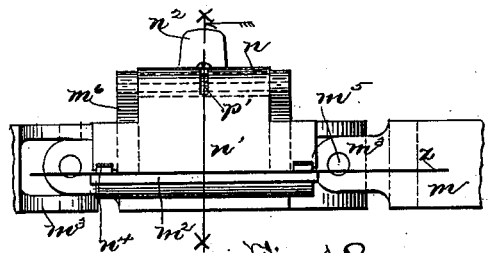
Figure 15:
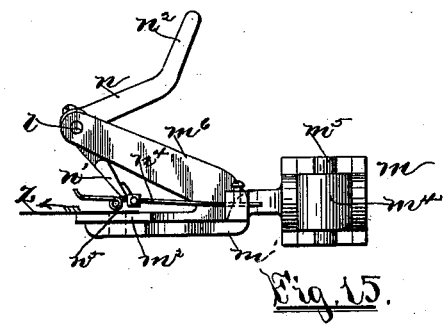
Figure 17:
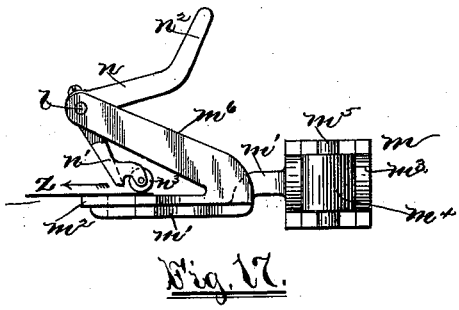
Figure 16:
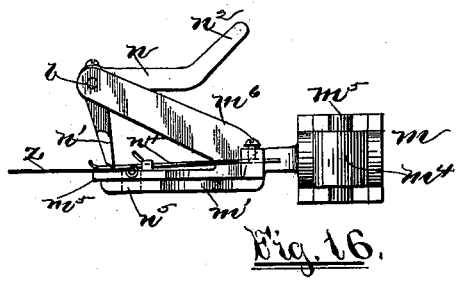
Figure 18:
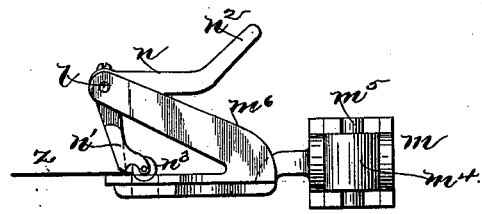

In the accompanying five sheets of drawings, Figure 1 is a side elevation of a tentering-machine embodying my improvements. Fig. 2 is a similar view, in enlarged scale, of the front or head portion of the machine. Fig. 3 is an end elevation of said portion. Fig. 4 is a corresponding plan view, the parts being represented in the central position. Figs. 5 and 6 are similar views, in reduced scale, showing the side rails, &c., vibrated or swung to the two extreme positions, as in "scrimping." Fig. 6½ is a modification of the roll-mounting. Fig. 7 is a side view, in enlarged scale, showing the delivery or rear portion of the machine and including the usual driving mechanism. Fig. 8 is a plan view of the same. Fig. 9 is a transverse section of the rail, &c., enlarged, taken substantially on line $o\ o$ of Fig. 2, showing the relation of the cloth to the chain-clip before the goods have been seized or clamped between the jaws of the clip. Fig. 10 shows the goods fully clamped between the jaws. Fig. 11 is a similar sectional view of the rail, opening-cam, &c., taken on line $x\ x$ of Figs. 1 and 7 at the instant the opening-cam lifts the upper jaw of the clip to release the now finished goods preparatory to being rolled or bolted. Fig. 12 is a side view of a portion of the chain and the automatic clip or jaws for holding the cloth. Fig. 13 is a plan view of the same. Fig. 14 is a transverse central section of the chain, &c., taken on line $x\ x$ of Fig. 12. Fig. 15 is an end view of the chain, showing a modified form of the clip, the jaws being open. Fig. 16 is a view of the same, the jaws being closed; and Figs. 17 and 18 are views corresponding with Figs. 15 and 16, showing another form of the clip mechanism.

I may state here somewhat briefly that tentering-machines are employed for stretching, smoothing, and drying continuous webs of cloth, but more especially cotton cloth. The cloth, in a wet or damp state and containing a suitable amount of size or "filling," is first fed by two attendants into the entering or head end of the machine, the attendants' duties being to partly smooth the cloth laterally and to properly present the selvages of it to the open jaws of the continuously-traveling carrier-chains. These latter gradually diverge in conformity with the previously-adjusted chain-guides or rails, the action of the cloth-carrying chains being to stretch the cloth both longitudinally and laterally. The cloth in traveling passes through a suitable drying-chamber, inclosing the major portion of the machine intermediate of the two end portions, after which it is delivered to the stripping-roll located at the discharge or driving end of the machine, and from the stripping-roll the cloth is guided to any suitable winding-machine, which operates to roll the cloth into bolts. In case the cloth is to be "scrimped" or have an elastic finish imparted to it, the said feeder-attendants' duties are greatly increased, thus necessitating greater skill on their part, from the fact that the two side chains are then being moved endwise bodily back and forth in an alternate manner, while they are also moving ahead continuously at the same time. Such an arrangement or chain action operates to disturb the fibers of the cloth and thereby give to it a fine wavy or "crinkly" effect. It is obvious that in thus moving the chains to and from the attendants the latter must be very skilful in order to properly feed the cloth to the jaws of the chain-clips.

In the drawings I have represented a tenter-machine constructed substantially as hitherto (except as to my present improvements combined therewith) and adapted to perform all the operations before described mechanically. The driving mechanism represented is constructed and arranged and located at the rear or delivery end of the machine, as usual. So, also, are the stands and frames or rails, as well as the means whereby the latter are capable of being adjusted laterally, so as to adapt the machine to goods having different widths. Machines of this class are frequently made thirty yards (or ninety feet) in length, its width between the rails being some six inches less at the feed end than at the other end, but the maximum or normal width is maintained for about nine-tenths of the length of the machine.

Again referring to the drawings, the tentering-machine as a whole is indicated by A, Fig. 1. The floor-stands $a$ are secured to the floor at suitable distances apart along the center of the machine, each being provided with a cross-arm $a'$ and saddle-block $a^2$, mounted to swivel in the top of the stand. A right and left hand opening-screw $s$ is rotatively mounted in the saddle-block and extends through the side frames or rails $b$, each of the latter having a nut (not shown) therein, through which the screw passes, the outer ends $s^2$ of the screw being adapted to receive a suitable operating handle or wrench. At the center of the screw is adjustably secured a worm-gear $s'$, intergearing on its lower side with and capable of being rotated by a worm (not shown) secured to the central longitudinally-extending opening-shaft $a^3$, the latter being mounted to revolve in fixed bracket-bearings $a^4$, secured to the floor-stands.

The usual main driving mechanism for operating tentering-machines, including the side carrier-chains and said opening-shaft, is represented in Figs. 7 and 8, and may be described as follows: The primary driving-shaft $g$ is mounted horizontally in suitable bearings and is provided with a pair of fast and loose pulleys $g'$ for operating it. A secondary shaft $h$ is arranged at right angles with shaft $g$, rotation being effected by means of a pair of bevel-gears $g^2$, secured to the respective shafts. Shaft $h$ is located centrally of the machine and carries a bevel-gear at its forward end, the latter intergearing with a similar gear, (shown by dotted lines in Fig. 7,) thereby imparting rotary motion to a short upright shaft, which in turn revolves the main rocking shaft $i$ through a pair of bevel-gears $h^2$. One of the latter is a clutch-gear loosely mounted on shaft $i$ and is capable of being thrown into and out of action at will by means of the clutch-lever $r^2$. Each end portion of shaft $i$ carries a small spur-gear, (shown dotted in Fig. 7,) the same intergearing with the two large combined chain-wheels and gears $v$. By means of this arrangement it is apparent that when the shaft $i$ revolves the chain-wheels $v$ will be forced to revolve and in unison with it. The arrow indicates the direction of rotation of the wheels $v$.

The shaft $i$ is termed the "main" rocking shaft. The means for effecting such rocking or vibratory movement is as follows: To the rear end of said horizontal shaft $g$ is secured a bevel-gear which meshes into a fellow gear secured to the vertical shaft $t^4$, the latter being mounted in the yoke $t^5$. A disk crank $t$ is secured to and surmounts the shaft $t^4$, the former having a radial slot $t^3$, in which a pin is adjustably mounted. To the rear end of shaft $i$ is fitted a strap $t^2$, a connection or link $t'$ uniting it to the disk pin. The stationary frame-standards $w^3$ are provided with fixed curved wings $w$, flat on the upper face, on which slide-blocks $w'$ rest. These slides have the shaft $i$ revolving therein. Thus it will be seen that the revolving shaft $i$ and its connected parts are vibrated back and forth by means of the revolving disk $t$, the relative speeds being constant, since all receive motion from primary shaft $g$. The stroke or throw of the rocking shaft can be altered by simply changing the position of the slot-pin with respect to the center of shaft $t^4$.

The two side frames or rails $b$ form guides for the carrier-chains B. Said rails are supported by the saddle-blocks $a^2$, mounted to slide on the end portions of the cross-arms $a'$, the ends of the opening-screws $s$ in turn passing through said saddle-blocks, as hereinbefore stated. The several screws $s$ are capable of being rotated simultaneously by means of the opening-shaft $a^3$ and the worm-gearing connecting it with the screws, thereby causing the two rails $b$ to be moved toward or from each other as desired. The rear end of shaft $a^3$ is provided with a wheel $k'$, through which the shaft may be rotated by manual power. It is adapted to be mechanically actuated at will in either direction by means of clutch-gearing $k$, driven by shaft $h$, upright shaft, (not shown,) and the pair of bevel-gears $k^2$, secured to the upright shaft and the opening-shaft $a^3$, respectively.

The combined chain-wheels and gears $v$ are adjustably mounted and revolve in brackets or gearing-head wings $u$, rigidly secured to the rear end of the longitudinally-movable rails $b$, a gear being used for each chain. It is through these brackets $u$ that the rails are alternately reciprocated, a swinging movement being imparted to them by means of the main rocking shaft $i$, &c. At suitable intervals the rails are provided with depending side brackets $c$, which are employed for supporting the carrier or guide wheels $c'$ for the side chains B.

The means for mechanically and automatically feeding the cloth to the machine is located at the front or head end, being at the left of the machine represented in Fig. 1. The said means referred to constitutes the essential part of my present invention and may be described as follows:

The reciprocating rails $b\ b$ are constructed substantially as common, but in addition they are provided at the front end at each side with the depending bracket or entering wing $b'$, the same being secured to the rail by bolts and a brace-rod $b^2$, as clearly shown in Figs. 2 and 3. These brackets carry upper and lower guide-wheels $b^3$, round which the tenter-chains B travel. (See arrows.) The course of the chain is indicated in Fig. 2 by broken lines.

The first floor-stand $a$ is located near the extreme front end of the machine, as shown. The opening-shaft $a^3$ extends beyond said stand and is supported in the stationary bearing $a^4$. To the latter is secured the feed-roll center bracket $e$, the latter extending toward the front and carrying at its free end a swivel-bearing $e^3$, in which is mounted the small horizontal rocking or oscillating shaft $e^2$, arranged transversely of the machine. The ends of this shaft are supported in swivel-bearings $e^4$, mounted to swing in the feed-roll end brackets $e^5$, secured to the said depending brackets or wings $b'$. $d\ d$ indicate a pair of horizontal friction feed-rolls arranged to receive the wet cloth or goods $z$ between them. These rolls are mounted to turn freely in the side arms $e'$, adjustably secured to the end portions of shaft $e^2$. The tension or pressure upon the cloth passing through the rolls may be regulated at will by adjusting-screws $d'$. As thus constructed it will be seen that the shaft $e^2$ and feed-rolls are oscillated by the action of the side rails $b$, the movement being in unison with that of the rails. Fig. 4 shows the parts in the central or mid-position, and Figs. 5 and 6 the two extreme positions. Fig. $6\frac{1}{2}$ shows the roll-arms $e'$ mounted on front side of brackets $b'$.

To the front end of the upper part of the rails are secured a pair of right-and-left castings, which I term "combined opening-cams and scrolls," the front portion being bent and hollow and extending downward and partly around the upper guide-wheels $b^3$, as clearly shown. It will be seen, too, referring to Figs. 3 and 4, that the said bent portion is provided exteriorly with a spiral or scroll-shaped rib member $f'$, the latter gradually increasing in height and terminating at the rear end of the piece in an overhanging inclined portion. (See Figs. 3 and 4.) This rib serves as a guide for the tongues of the upper jaws of the chain-clip, soon to be described. The said hollow part of the cam-piece $f$ follows the contour of the latter, its front end receiving and housing the chain-links passing over the upper wheel $b^3$ and guiding them in a spiral manner to the chain-chamber formed on top of the rails.

To the top of the rails $b$ (see enlarged scale, Fig. 9, which shows a transverse section of the rail, &c.) is secured a continuous chain-cover $b^4$ and chain-guide member $b^5$, the parts being constructed and arranged so as to form a chamber or space in which the chain-links travel. The said cover $b^4$ has a portion of its inner vertical side or wall removed, thereby forming between it and the adjacent edge of guide $b^5$ a continuous narrow opening $b^6$, through which the arms or brackets $m'$ of the links extend. The said openings $b^6$ of the two rails face each other and extend the entire length of the rails. Thus it will be apparent that the endless chains B are capable of traveling freely and uninterruptedly in the arrow direction and at a uniform rate of speed, and even when they are reciprocating bodily back and forth in unison with the rails. By again referring to Figs. 7 and 8 it will be seen that the periphery of the chain wheel or sprocket is provided with a series of lugs or dogs $v'$. These enter the central space $v^2$ of the links, Fig. 13, thereby positively driving the chain by and concurrently with the rotation of the main rocking shaft $i$.

My improved carrier-chain B is particularly adapted to be employed on the tenter-machine herein illustrated and described, from the fact that it is capable of being deviated laterally from the normal working plane while it is in motion. Tenter-chains as usually constructed can only travel in substantially invariable planes, owing to the manner of connecting the links together, the planes in some cases being horizontal and in others vertical.

In my improved chain the links $m$ thereof are, as drawn, provided with a pair of laterally-separated ears $m^3$ at each end, the ears at one end being arranged at right angles with those of the other end of the link. A joint-block $m^4$ is placed between and pivoted to the ears, the ears of the fellow link being at right angles to the latter ears and also receiving said block $m^4$ and being pivoted to it by pins or trunnions $m^5$, (see Figs. 13 and 15,) thereby forming a universal joint. The inwardly-facing side of each link member is provided with one or more thin lateral arms or brackets $m'$, which carry a fixed flat plate $m^2$, and forms the lower jaw of the clip or cloth-holder. The upper surfaces of the plates have the selvage portions of the cloth $z$ resting upon them during its passage through the machine. The plates $m^2$ are provided each with a pair of laterally-separated arms $m^6$, extending upwardly at an angle and terminating above the outer or clamping edge of the plate. The ears are drilled to receive a pin $l$, on which the upper or independently-movable jaw member $n$ is adjustably mounted.

The lower or jaw portion proper, $n'$, of member $n$ has a straight edge adapted in use to impinge upon the upper surface of the cloth. In order to allow for wear, &c., the jaw $n$ is drilled to receive a sleeve or bushing $p'$, which in turn is drilled eccentrically to receive the said pin $l$, the parts being secured together after adjustment by means of a set-screw $p^2$. Thus it will be seen that the edge of jaw $n'$ is capable of being adjusted vertically within fixed limits with respect to surface of plate $m^2$ by simply loosening screw $p^2$ and turning sleeve $p'$ axially the desired distance, followed by resetting the screw. The upper portion of member $n$ is arranged at substantially right angles with the clamping portion and terminates in an upwardly-bent extension $n^2$, thus forming a tongue which in traveling is adapted to engage certain opening-cams $f'$ $o$. The said upper portion of the jaw member is heavier than the part $n'$, thereby making the jaw self-closing. The chain-clips are each further provided with a pair of spring-fingers $n^4$, which extend beyond the edge of jaw $n'$, (the latter being cut away for the purpose.) Each finger has a curved smooth lug $n^5$ on its under side adapted to frictionally engage the upper surface of the cloth before the latter has been seized by the clamping-jaws. The lower jaw or plate $m^2$ is recessed to receive said lugs. Figs. 9, 11, and 15 show the corresponding relation of the parts to the cloth, and Figs. 10, 14, and 16 show the same at the instant the cloth has been drawn away from the lugs, the upper jaw at the same time swinging down automatically and snugly impinging upon it, thereby securely holding the cloth during its passage through the machine. In lieu of the spring-fingers and lugs just described the lower jaw may be provided with small end rollers $n^3$, (see Figs. 17 and 18,) the arrangement being such that after the cloth is drawn outwardly past the rollers the weighted portion of the upper jaw causes the lower edge of the part $n'$ to instantly engage the cloth at the selvage. (See Fig. 18.) It will be seen that any pull or tension upon the cloth in a direction outward from the clips, after the goods have been seized between them, will only act to hold it the more firmly therein, the arrangement being somewhat analogous to a "toggle-joint."

Assuming now that the several parts of my improved cloth-tentering machine have first been properly set or adjusted, and that the primary shaft $g$ is being driven at the desired speed, the operation may be described as follows: The wet goods $z$ passes upwardly between the feed-rolls $d$. The selvages of it then enter the open jaws of the two continuously-traveling side carrier-chains B, (the jaws meanwhile being kept wide open by the means of the engagement of the tongues $n^2$ with the relatively stationary spiral cams $f'$.) The upper jaws fall by gravity immediately after passing said cams until arrested by the lugs $n^5$, as shown in Fig. 9, and since the chains gradually diverge to stretch the cloth laterally the said lugs or rollers $n^3$ of the links will thereby be drawn away from contact with the cloth, at which instant the lower edge of the jaws will further fall and impinge upon the cloth and snugly clamp it. (See Figs. 10, 14, 16, and 18.) I may state here that in machines of this class it is usual to house portions thereof to form drying-chambers. In Fig. 1, D indicates such a chamber, capable of being suitably heated, through which the machine extends. The cloth while thus held by the jaws of the chains is thoroughly dried in its passage through the chamber, after which the jaws are successively opened by contact with the rear opening-cams $o$, secured to the side rails $b$. The cloth now being thus released, passes over the stripping or delivery roll $r$ and thence to suitable winding mechanism, where it is rolled into bolts.

In case the goods $z$ are to be scrimped or soft-finished the continuously-revolving main rocking shaft $i$ is to be connected with the crank-disk $t$, thereby imparting to the chain-gearing, chains, rails $b$, and feeding mechanism an oscillating movement to and fro, the relation of the chain, &c., to the rails and feeding means being substantially the same as when non-oscillating. Figs. 4, 5, and 6 show the corresponding positions of the feed-rolls, &c., to the rails and chain-guides.

From the foregoing it will be evident that after properly introducing the cloth to the machine its action is wholly mechanical and automatic, an attendant being required simply to sew the ends of the lengths of cloth together to form a continuous web and to make the necessary adjustments from time to time.

In this machine, too, the parallelism of the rails is maintained at all times, even when they are being reciprocated past each other. Consequently no loosening or slackening of the cloth takes place, because the tension upon it is practically uniform in a lateral direction.

While, as hereinbefore stated, tenter-machines have been employed having reciprocating chains provided with jaws arranged to clamp the cloth automatically, they were not self-feeding, nor were the chains capable of being run in vertical planes. Therefore I make no claim, broadly herewith, to the driving mechanism, nor to means for reciprocating the rails or side frames $b$ back and forth, nor even to tenter-chains having automatic clips. My invention resides, essentially, in providing tentering-machines with means for automatically feeding the cloth and having carrier-chains coacting therewith capable of moving in different planes.

I would further add that in a tentering-machine having the tenter-chains constructed substantially as usual and traveling in practically invariable vertical planes it is a very difficult matter to properly feed the cloth to the jaws or clips of the chains from the fact that the action of such chains presents the back or exterior of the clips directly in the normal path of the cloth. In a machine provided with my improvements it will be seen that owing to the novel manner of connecting the links the traveling chains are separated laterally a distance considerably exceeding the width of the cloth at the points where they travel upwardly and around the front guide-wheels $b^3$ before the chains enter the spiral cam-guides $f$. These latter gradually converge toward one another, the jaws remaining open meanwhile, the traveling links at the same time readily conforming to the spiral path by reason of the novel link-joints which allow the chains to deviate from the normal vertical plane into other planes. By this arrangement the two side chains and their clips are kept laterally separated a distance exceeding the width of the cloth $z$, where it is fed horizontally from the rolls $d$ into the front end of the machine. As the now practically level converging chains are guided along the corresponding part of the cams $f$ the selvages of the cloth are readily introduced into the open jaws, since all are traveling in unison in the same horizontal plane. After the links pass the rear end of said cams the upper jaws successively fall by gravity and firmly impinge the cloth between the jaws, substantially as before stated.

I claim as new and desire to secure by United States Letters Patent—

1. In a cloth-tentering machine, the combination, substantially as hereinbefore set forth, with the endwise-movable rails, the traveling chains mounted in the rails provided with self-closing clips or jaws, and means for reciprocating said rails alternately, of guides for said chains located at the front end and on opposite sides of the machine adapted to reciprocate in unison with said rails, and oscillating feed-rolls mounted at the front end of and arranged with relation to said rails and chain-guides, whereby the fabric is fed mechanically into the jaws of said chains in a continuous and uniform manner.

2. In a cloth-tentering machine, the combination with the traveling tenter-chains having self-closing clips or jaws, of normally-stationary right and left spiral-shaped chain-guides, located at the front end and on opposite sides of the machine, provided with cams for holding the said chain-jaws open, and friction-feed rolls which deliver the cloth to the chain-jaws automatically, substantially as described.

3. In a cloth-tentering machine, the combination with a pair of oppositely-arranged tenter-chains traveling in substantially vertical planes and provided with self-closing jaws arranged to receive the edges of the cloth between them, of a pair of normally-stationary oppositely-arranged inclined or spiral guides arranged in vertical planes and located at the front end of the machine, over which the said chains travel; the action of said guides being to gradually reduce the distance between the chains transversely of the machine at the point where the cloth enters before it is seized by the said clamping-jaws, substantially as hereinbefore described.

4. In a cloth-tentering machine, the two side rails, traveling endless chains mounted in said rails provided with a series of self-closing jaws, and mechanisms for intermittingly vibrating or reciprocating said rails and chains so as to impart an elastic finish to the goods passing through the machine, in combination with spiral guides, as $f$, secured to the front end of said side rails, and a pair of feed-rolls reciprocating in unison with the rails and arranged to automatically deliver the traveling cloth to the open jaws of said chains before they leave the said guides, substantially as set forth.

5. In a cloth-tentering machine, the combination, with the reciprocating side rails and cloth-carrying tenter-chains mounted therein, of right and left spiral guides for said chains secured to the forward end and on opposite sides of said rails for gradually converging the traveling chains toward each other from the normal vertical planes into other planes, and means, substantially as described, for mechanically feeding the traveling cloth to the chains.

6. In a cloth-tentering machine having oppositely-mounted adjustable reciprocating side rails, as $b$, and provided with the usual adjunctive devices for actuating the mechanisms, the combination of a pair of continuously-traveling carrier-chains mounted in said rails, the links of the chains being united by universal joints and having self-closing jaws or clips, oscillating feed-rolls working by and in unison with said side rails, substantially as described, for automatically feeding the cloth into the open jaws of the traveling chains, and cams or dogs for opening the chain-jaws at predetermined points, for the purpose specified.

7. In a cloth-tentering machine, a pair of laterally-separated reciprocating side rails, as $b$, fixed floor-stands, horizontal cross-arms pivotally mounted in said stands and supporting the side rails, means connected with said cross-arms, for adjusting the rails in a lateral direction, an endless chain mounted in each rail provided with self-closing jaws and linked together by universal joints, means for propelling the chains continuously in one direction at a substantially uniform rate of speed, right and left spiral guides for said chains secured to the forward end and on opposite sides of said rails, mechanism for feeding the cloth to the open jaws of said chains, and means for opening the jaws at fixed points on the machine, substantially as described and for the purpose set forth.

In testimony whereof I have affixed my signature in presence of two witnesses.

AMOS W. C. ARNOLD.

Witnesses:
GEO. H. REMINGTON,
REMINGTON SHERMAN.